(12) United States Patent  
Meeks et al.

(10) Patent No.: US 7,391,597 B2
(45) Date of Patent: Jun. 24, 2008

(54) SWITCHGEAR WITH ARC-RESISTANT FEATURES

(75) Inventors: Tyrone C. Meeks, Oak Forest, IL (US); Amit R. Patel, Des Plaines, IL (US); Raymond P. Loback, Aurora, IL (US)

(73) Assignee: S&C Electric Co., Chicago, IL (US)

( * ) Notice: Subject to any disclaimer, the term of this patent is extended or adjusted under 35 U.S.C. 154(b) by 461 days.

(21) Appl. No.: 11/079,710

(22) Filed: Mar. 14, 2005

(65) Prior Publication Data

US 2005/0258141 A1    Nov. 24, 2005

Related U.S. Application Data

(63) Continuation of application No. PCT/US03/31894, filed on Oct. 9, 2003.

(60) Provisional application No. 60/418,110, filed on Oct. 11, 2002.

(51) Int. Cl.
H02H 7/00 (2006.01)

(52) U.S. Cl. .................................................. 361/115

(58) Field of Classification Search ............... 361/62, 361/115
See application file for complete search history.

(56) References Cited

U.S. PATENT DOCUMENTS

| 4,431,877 | A | * | 2/1984 | Heft et al. | .................. | 218/136 |
| 4,570,202 | A | * | 2/1986 | Nishida et al. | .............. | 361/604 |
| 4,609,898 | A | * | 9/1986 | Seymour et al. | ............ | 335/202 |
| 6,179,637 | B1 | * | 1/2001 | Lee et al. | ..................... | 439/248 |

* cited by examiner

Primary Examiner—Stephen W Jackson
(74) Attorney, Agent, or Firm—James V. Lapacek

(57) ABSTRACT

An arrangement capable of being assembled with either an existing installed electrical equipment enclosure having an access door or during the fabrication and assembly of such an electrical equipment enclosure that increases the arc-resistant capabilities and characteristics of the electrical equipment enclosure. The arc-resistant capabilities of the electrical equipment enclosure are increased via the provision of shielding facilities disposed in the vicinity of the access opening of the enclosure to substantially limit the heat generated by internal arcing within the enclosure from reaching the access door to the enclosure.

7 Claims, 5 Drawing Sheets

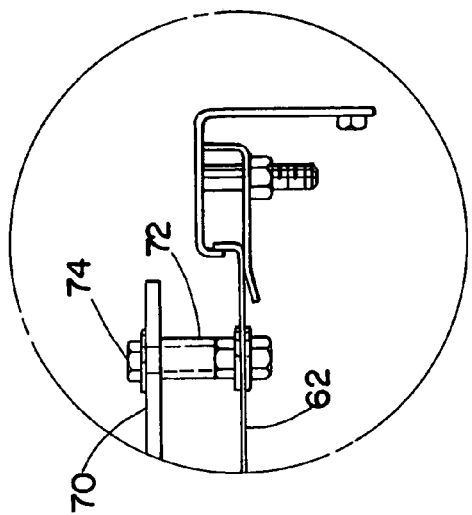
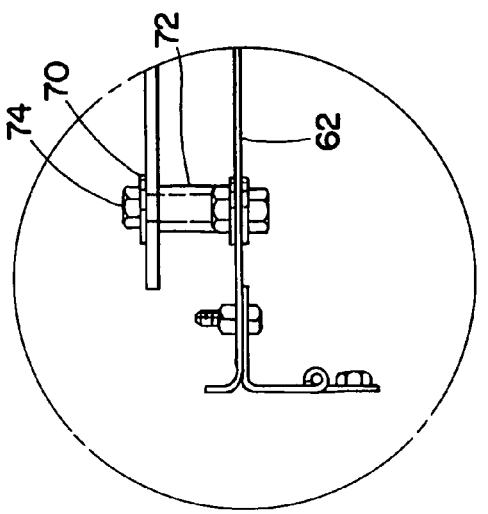
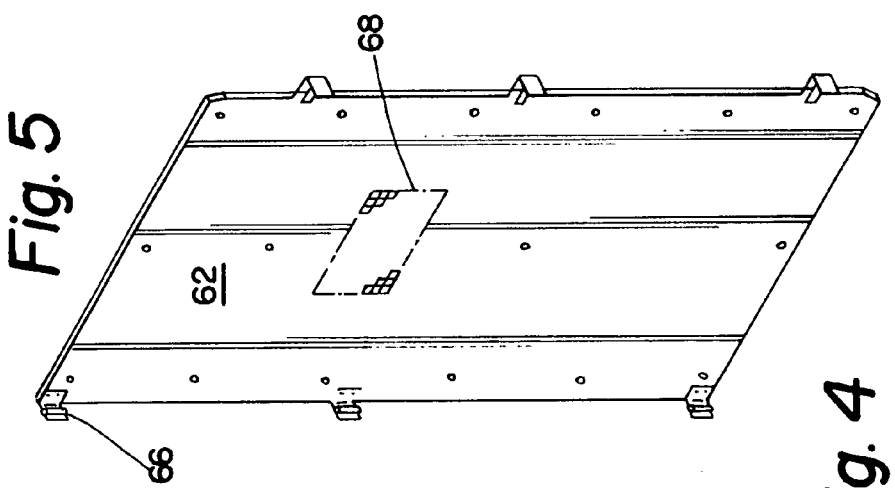
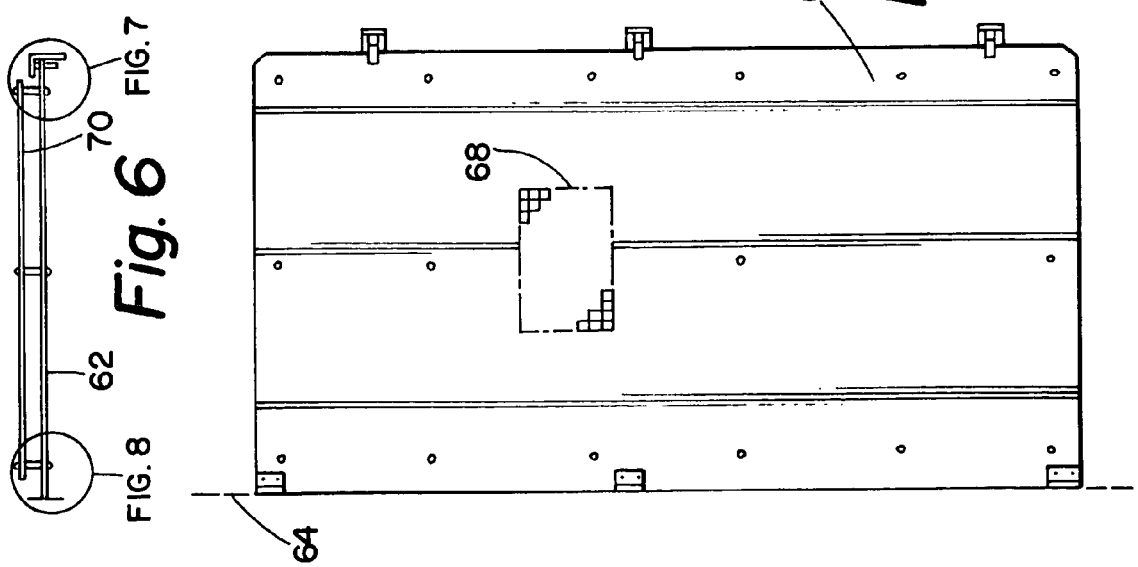

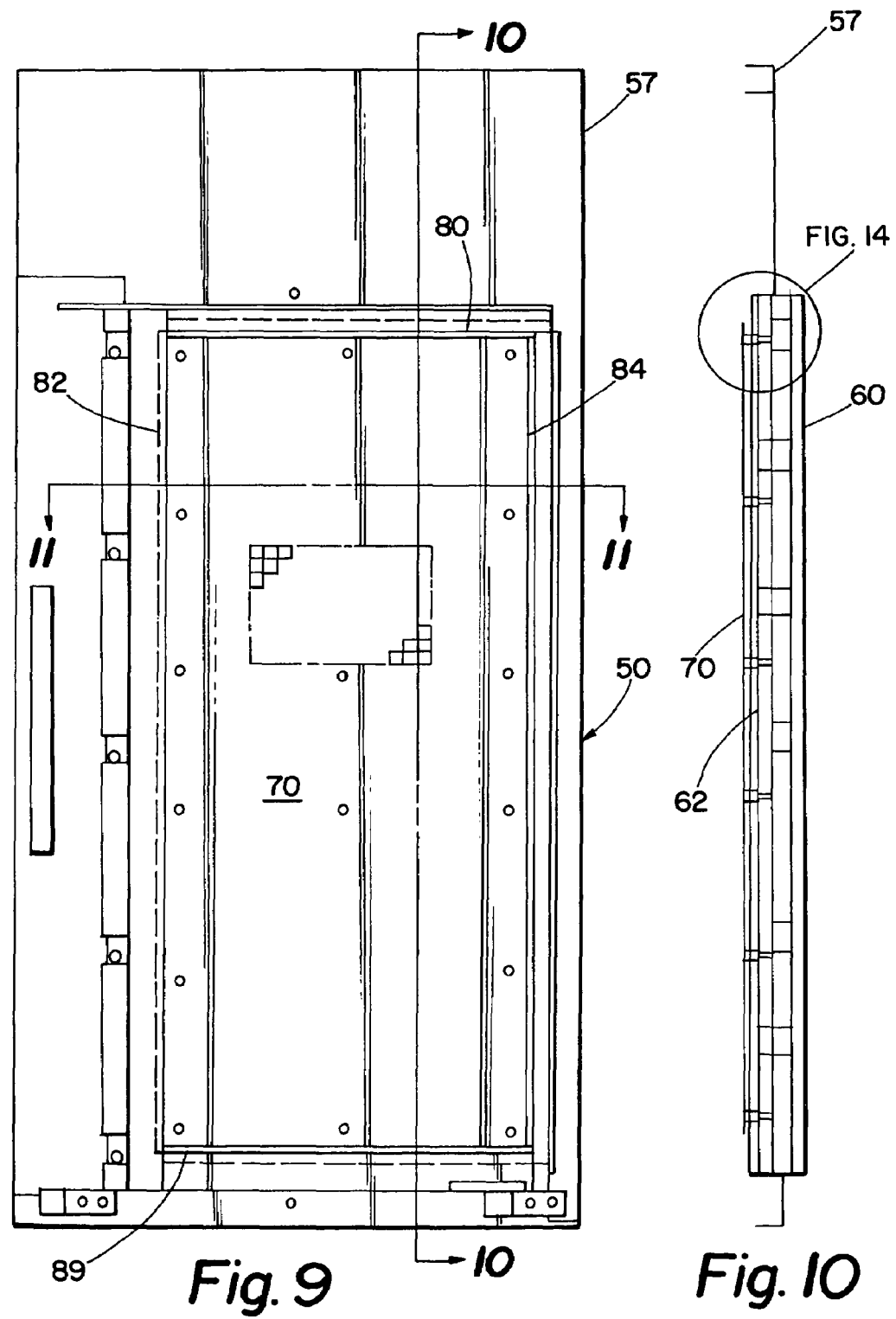

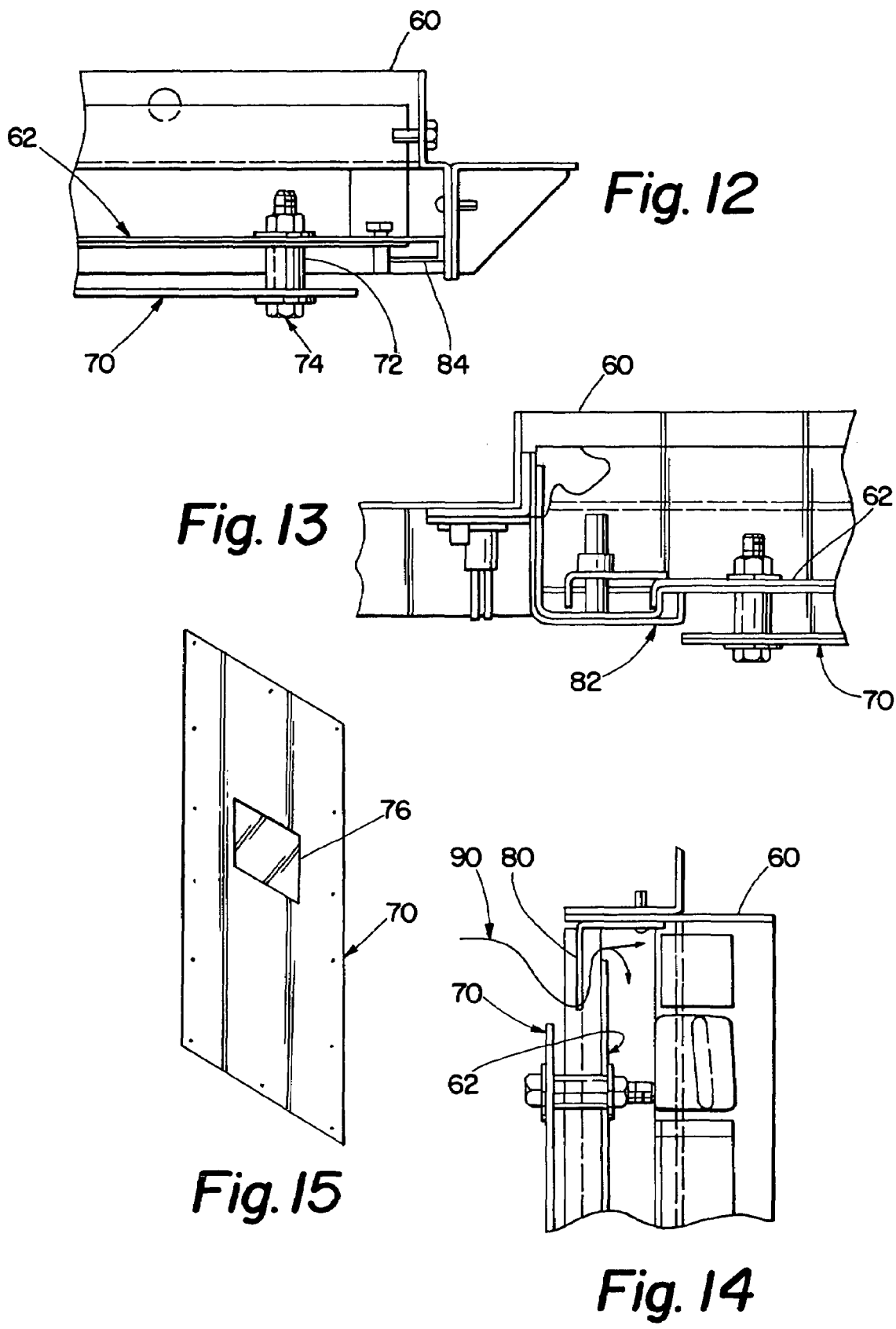

SWITCHGEAR WITH ARC-RESISTANT FEATURES

This application is a continuation of Application No. PCT/US03/31894 filed on Oct. 9, 2003 which is a continuation of and claims the benefit of U.S. Provisional Application No. 60/418,110 filed Oct. 11, 2002.

BACKGROUND OF THE INVENTION

1. Field of the Invention

The present invention relates generally to the field of switchgear for electrical power distribution and more particularly to an arrangement and method for improving the arc-resistant features and capabilities of switchgear that is applicable either during fabrication or as a retrofit to existing equipment in the field.

2. Description of the Related Art

Various types of arc-resistant switchgear are known in the prior art, for example, as shown in U.S. Pat. Nos. 6,100,778, 5,574,624, 5,689,097, 5,710,402, 5,892,195 and 5,414,584. These typically include pressure relief arrangements that quickly relieve internal pressures developed during any arcing ensuing as the result of an internal short circuit or the like, i.e. a fault condition established within the switchgear. However, during the fault condition, the switchgear must also withstand the effects of the intense internal temperatures and pressures prior to and after the pressure relief features are operable. For example, it is desirable that all venting of the internal pressure occur via the pressure relief features and that the access doors and seals remain intact. Arc-resistant switchgear is the subject of various standards, e.g. Canadian standard EEMAC G14.1. Such standards describe various tests and characteristics that are desirable for such equipment.

While the arrangements of the prior art may be generally suitable for their intended uses, it would be desirable to provide arc-resistant switchgear with increased capabilities.

SUMMARY OF THE INVENTION

Accordingly, it is a principal object of the present invention to provide switchgear with increased arc-resistant capabilities.

It is another object of the present invention to provide a kit of component parts for the field retrofit of switchgear to increase the arc-resistant capabilities and characteristics of switchgear.

These and other objects of the present invention are efficiently achieved by an arrangement capable of being assembled with either an existing installed electrical equipment enclosure having an access door or during the fabrication and assembly of such an electrical equipment enclosure that increases the arc-resistant capabilities and characteristics of the electrical equipment enclosure. The arc-resistant capabilities of the electrical equipment enclosure are increased via the provision of shielding facilities disposed in the vicinity of the access opening of the enclosure to substantially limit heat generated by internal arcing within the enclosure from reaching the access door to the enclosure.

BRIEF DESCRIPTION OF THE DRAWING

The invention, both as to its organization and method of operation, together with further objects and advantages thereof, will best be understood by reference to the specification taken in conjunction with the accompanying drawing in which:

FIGS. 4-6 are respective front elevational, perspective and top plan views of a movable screen assembly of the present invention that is utilized to improve the arc-resistant capabilities of the switchgear of FIGS. 1 and 2;

FIGS. 7 and 8 are respective enlarged detailed views of the portions of FIG. 6 as indicated in FIG. 6;

FIGS. 9-11 are respective front elevational, right-side elevational and top plan views of the movable screen assembly of the present invention and additional facilities of the present invention as installed in the arc-resistant switchgear of FIGS. 1 and 2;

FIGS. 12 and 13 are respective enlarged detailed views of the portions of FIG. 11 as indicated in FIG. 11;

FIG. 14 is an enlarged detailed view of a portion of FIG. 10 as indicated in FIG. 10; and FIG. 15 is a perspective view of a heat shield of the present invention utilized with the facilities of FIGS. 4-14 in the arc-resistant switchgear of FIGS. 2 and 3.

DETAILED DESCRIPTION

Figure 1:
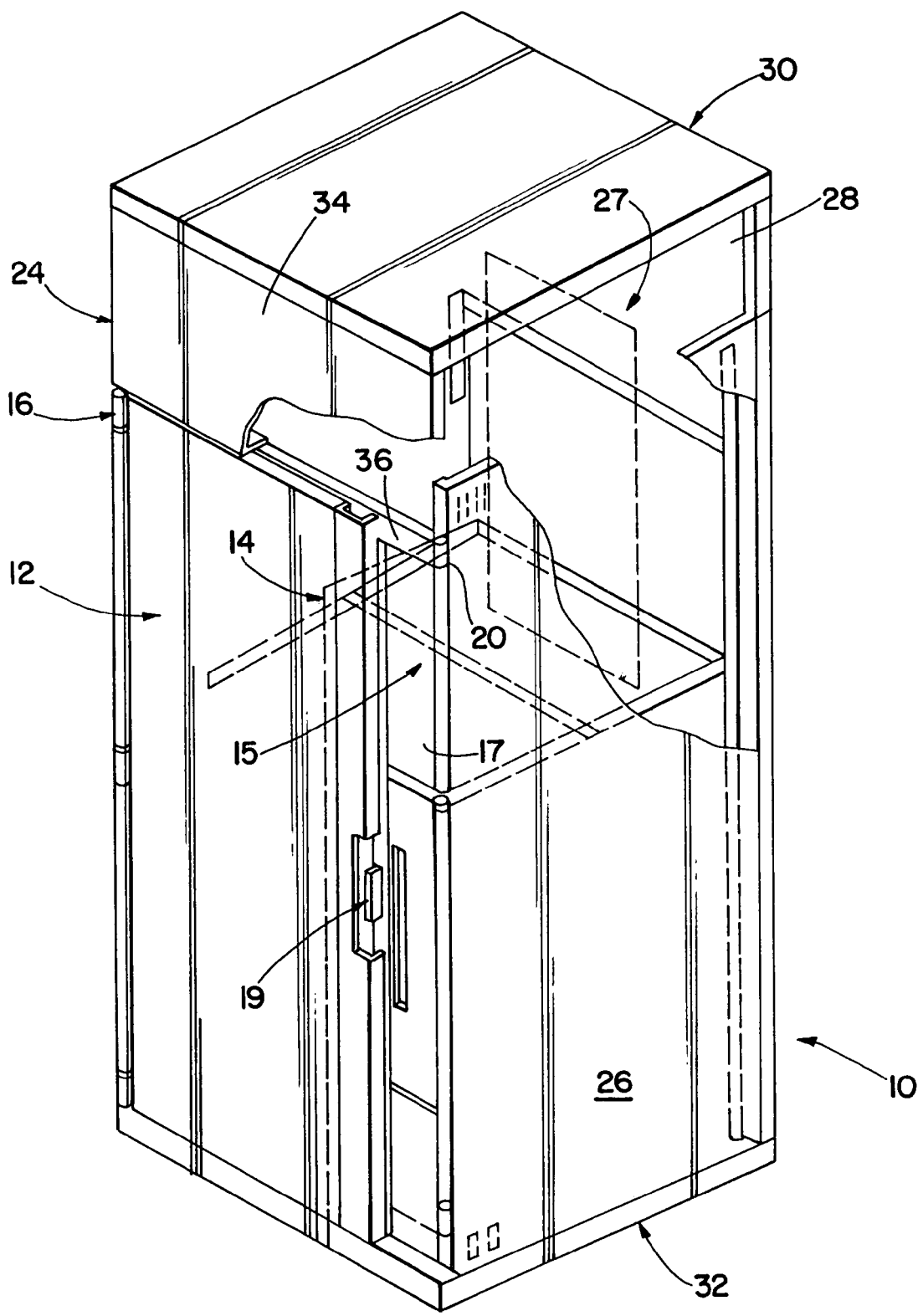
FIG. 1 is a perspective view of one type of switchgear enclosure to illustrate the general construction of an enclosure that may be utilized for switchgear.

Referring now to FIG. 1, the enclosure 10, as described in more detail in U.S. Pat. No. 4,862,324, is an illustrative example of the general type of enclosure that is suitable for use with switchgear in accordance with the present invention as will be explained in more detail hereinafter. The enclosure 10 is a self-contained metal enclosure to which access is provided by a left door 12 which is pivotally mounted with respect to the enclosure 10 by a plurality of hinges 16. The interior of the switchgear enclosure 10 houses electrical components such as switches, potential transformers, fuses or other electrical components. In some installations and applications, for example for outdoor use, a right cover 14 is provided that partially overlaps the closed left door 12 and that also overlies a low-voltage compartment 15 that houses switch operators and automatic control equipment; controls for these arrangements being found on the compartment panel 17 which is accessible when the right cover 14 is in the open position. The right cover 14 is pivotally mounted with respect to the enclosure 10 by means of a plurality of hinges 20. The low-voltage right cover 14 overlaps a portion of the medium-voltage compartment left door 12 so that the medium-voltage compartment door 12 via a latch mechanism indicated generally at 19 cannot be actuated to open the left door 12 until the right cover 14 is opened. In a preferred embodiment, to provide additional security measures in addition to padlocks or the like, the right cover 14 includes access control provisions as provided by a latching mechanism (not shown) which automatically latches upon door closure and which utilizes a specially adapted tool for the opening thereof, as described in more detail in U.S. Pat. No. 4,489,966. The enclosure 10 is defined by left and right sidewall panels 24 and 26, respectively, a backwall panel 28, a roof 30 and a base 32. An upper channel 36 and a lower channel 38 span the front access opening and are fastened to the sidewalls 24,26. When the door is the height as shown, a front panel 34 is provided. If the height of the door 12 is the full height of the enclosure 10 between the base 32 and the roof 30, then no front panel 34 is utilized and the upper channel 36 is mounted adjacent the roof 30. As an illustrative example, for fabrication of the enclosure 10, the sidewalls 24, 26 and the backwall 28 are prepared, e.g. from 11-gauge sheet metal, by appropriate shearing, punching and forming. Next, the panels 24, 26 and 28 are painted prior to assembly. During assembly, the panels 24, 26 and 28 are assembled along with the roof and the base 32 via fasteners, not shown. The enclosure 10 is then ready for installation of the various components; no further manufacturing process tasks being required since the panels, roof and base have been previously painted before assembly thereof to define the enclosure. After the installation of the components, the doors 12,14 via hinges 16,20 are respectively attached.

Figure 3:
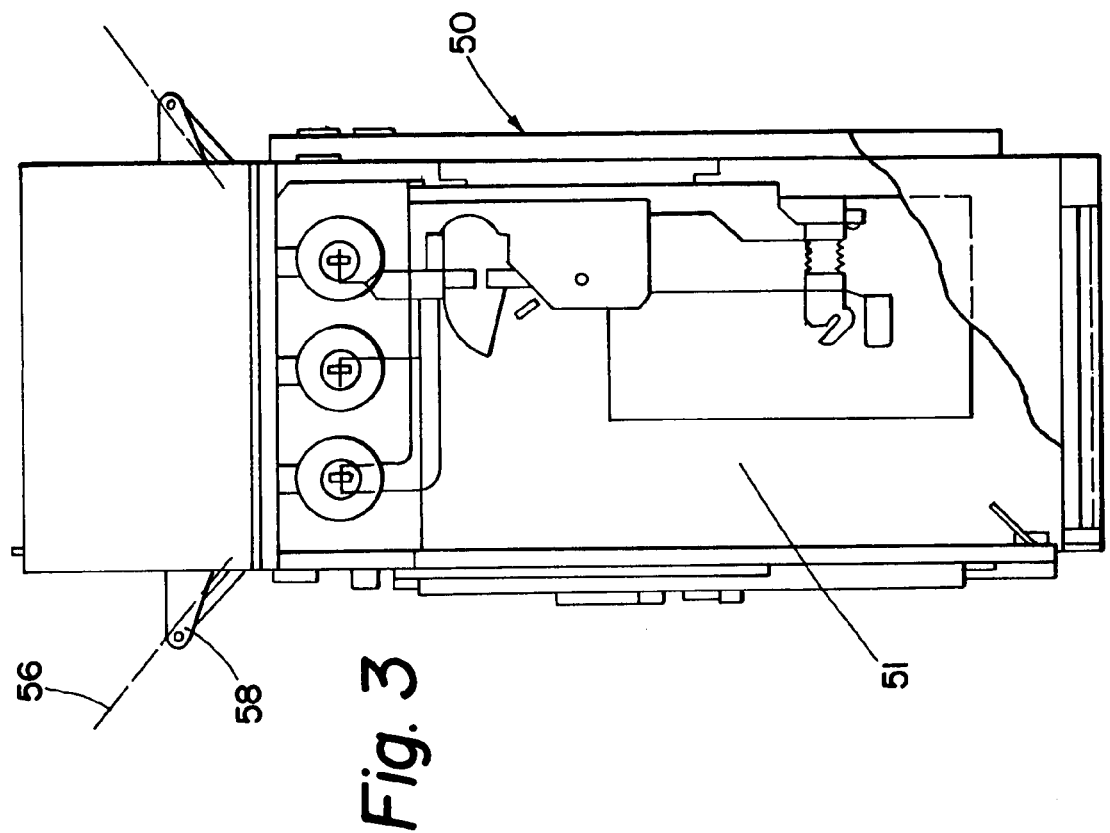
FIGS. 2 and 3 are respective front and right-side elevational views, with parts removed for clarity, of illustrative arc-resistant switchgear utilizing an enclosure of the type in FIG. 1 and to which the present invention may be applied.
Figure 2:
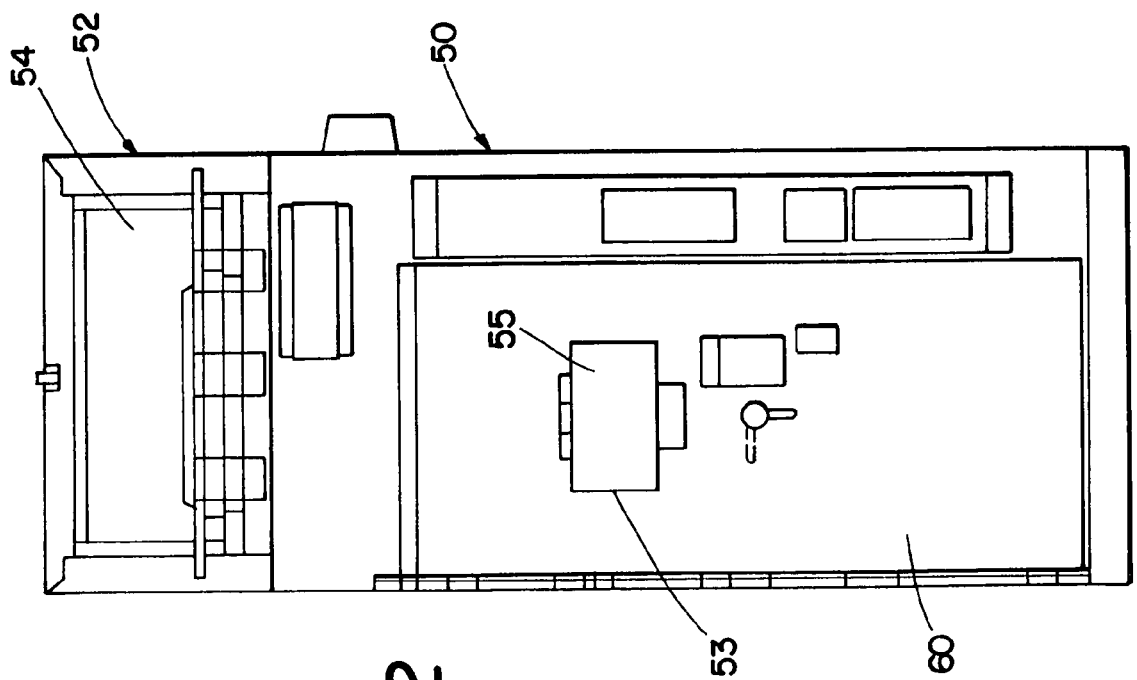

With additional reference now to FIGS. 2 and 3, illustrative arc-resistant switchgear 50 is shown that is suitable for the practice of the present invention in accordance with the provision of the facilities as will be described in more detail hereinafter. The arc-resistant switchgear 50 includes a pressure-relief arrangement 52 that includes provision for venting in response to overpressures due to the occurrence of an internal arcing fault within the switchgear 50, e.g. via the opening of vent flaps 54 to the position indicated in dashed lines at 56. The pressure-relief arrangement 52 is provided in lieu of the roof 30 of the enclosure 10. Provisions at 58 are provided to limit the movement of the vent flaps 54 beyond the position 56. While the opening of the vent flaps 54 is almost instantaneous in response to internal overpressure in the arc-resistant switchgear 50, the arc within the arc-resistant switchgear 50 is capable of causing extreme heat and arcing effects even during the fraction of a second it takes for these vent flaps 54 to open and relieve the pressure and divert the arcing gases upward and outward away from the arc-resistant switchgear 50. A front panel 57 of the arc-resistant switchgear 50 includes an access opening 51 which is covered by the door 60 when in a closed position as shown in FIGS. 2 and 3.

In accordance with important aspects of the present invention and referring now additionally to FIGS. 4-15, to provide increased arc-resistant capabilities to the arc-resistant switchgear 50, e.g. so as to ensure that no gas is vented at the door 60, facilities are provided to shield the door 60 from the effects of the arcing within the arc-resistant switchgear 50. To this end, a heat shield 70 (best seen in FIG. 15) is disposed intermediate the door 60 and the interior of the arc-resistant switchgear 50, the heat shield 70 being generally planar and also being characterized as a barrier.

In the illustrative embodiment, heat shield 70 is movably mounted to provide access to the interior of the arc-resistant switchgear 50 after the door 60 is opened. In the illustrative embodiment, the arc-resistant switchgear 50 is of the type that includes a movably mounted screen door 62, e.g. the screen door 62 being movably supported with respect to the arc-resistant switchgear 50 at a hinge axis 64 via hinges 66. In that case, the heat shield 70 is arranged to be carried by the screen door 62 so as to be movable therewith as shown in FIGS. 4-8. Specifically, in the illustrative embodiment, the heat shield 70 is mounted with respect to the screen door 62 via spacer elements 72 and suitable fasteners referred to generally at 74. Thus, to gain access to the arc-resistant switchgear 50, the door 60 is opened, then the screen door 62 carrying the heat shield 70 is opened. Typically, the screen door 62 includes one or more areas of perforated, mesh opening, e.g. 68 that is aligned with a window 53 of the arc-resistant switchgear 50 for viewing the interior of the arc-resistant switchgear 50 without opening the door 60. The window 53 is selectively covered by a lockable cover 55 in the illustrative embodiment. In that case, the heat shield 70 is also provided with a transparent portion, e.g. at 76, to define a window that is aligned with the window 53 and the perforated opening 68, the transparent portion being a suitable plastic such as Lexan. The heat shield 70 is arranged to substantially limit internal arcing and the heat generated thereby from reaching the door 60, i.e. for at least a sufficient time interval for the venting arrangement of the arc-resistant switchgear 50 to operate so as to divert the arcing gases away from the door 60. For example, it has been found suitable to fabricate the heat shield 70 from fiberglass, NEMA grade GPO-3, 3/16 of an inch in thickness, with a spacing of approximately 7/8 of an inch between the heat shield 70 and the screen door 62. In this manner, the no venting occurred from the door 60 in response to a 40 kA symmetric current fault simulation with 101.7 kA peak current for a one second duration. It has also been found advantageous to limit the path of the hot arcing gasses that might pass around the perimeter of the heat shield 70, e.g. due to the fact that the door 60 is sufficiently large to cover the access opening 51 of the arc-resistant switchgear 50 and the heat shield 70 is smaller than and fits within the dimensions of the access opening 51 so as to be movable through this access opening 51 upon opening of the heat shield 70 with the screen door 62. To this end, and with reference now to FIGS. 9-14, facilities are provided around the perimeter of the access opening 51 of the front panel 57 of the arc-resistant switchgear 50 so as to substantially prevent arcing gasses from directly passing around the perimeter of the heat shield 70 to the vicinity of the door 60. Specifically, in the illustrative embodiment, deflection members are provided about the perimeter of the heat shield so as to extend in a direction approximately parallel to the plane of the heat shield 70, e.g. via members 80, 82, 84 and 86. In this manner, the arcing gasses can not pass directly past the periphery of the heat shield 70, but instead, as shown in FIG. 14, are required to follow a tortuous or circuitous path referred to at 90 in order to move past the heat shield 70. The deflection members 80, 82, 84 and 86 are formed from angle stock in the illustrative embodiment. As shown in FIGS. 9-14, the members 80, 82, 84 and 86 are preferably exteriorly of the heat shield, i.e. between the door 60 and the heat shield 70 so as to establish a tortuous path for gases internal to the arc-resistant switchgear 50 in a manner that maximizes the dimensions of the access opening 51.

For field retrofit, a kit of component parts may be provided including the heart shield 70, the spacer elements 72, fasteners 74 and the deflection members 80, 82, 84 and 86.

While there has been illustrated and described a preferred embodiment of the present invention, it will be apparent that various changes and modifications will occur to those skilled in the art. Accordingly, it is intended in the appended claims to cover all such changes and modifications that fall within the true spirit and scope of the present invention.

The invention claimed is:

1. Arc-resistant switchgear comprising:
    an enclosure defining an interior and an access opening and having a movable door for covering the access opening; and
    heat shielding means being movably disposed with respect to the access opening for substantially limiting the flow of hot gas from the interior of the enclosure, said heat shielding means comprising a generally planar barrier member, said heat shielding means further comprises deflection members disposed with respect to the access opening and about the perimeter of said barrier member.

2. The arc-resistant switchgear of claim 1 wherein said deflection members are arranged with respect to said barrier member so as to define a tortuous path from the interior of the enclosure to the door.

3. The arc-resistant switchgear of claim 1 wherein said deflection members are disposed so as to extend in a direction substantially parallel to the barrier member.

4. Arc-resistant switchgear comprising:
an enclosure defining an interior and an access opening and having a movable door for covering the access opening;
heat shielding means being movably disposed with respect to the access opening for substantially limiting the flow of hot gas from the interior of the enclosure, said heat shielding means comprising a generally planar barrier member; and
a movable screen door interior to the movable door, said barrier member being carried by said movable screen door.

5. Arc-resistant switchgear comprising:
an enclosure defining an interior and an access opening and having a movable door for covering the access opening; and
heat shielding means being movably disposed with respect to the access opening for substantially limiting the flow of hot gas from the interior of the enclosure, said heat shielding means comprising a generally planar barrier member, said barrier member being fabricated from an insulating material.

6. A kit of component parts for improving the arc-resistant capabilities of a switchgear enclosure defining an interior and an access opening and having an outer movable door for covering the access opening and an inner movable screen door, the kit comprising heat shield means for affixing to the inner movable screen so as to face the interior of the switchgear enclosure, said heat shield means comprising a generally planar barrier, spacing element means for placement between the inner movable screen and the heat shield means, and deflecting members for attachment about the access opening of the enclosure in a manner that established a tortuous path from the interior of the enclosure to the outer movable door.

7. A heat shielding arrangement for switchgear for improving the arc-resistant capabilities of a switchgear enclosure defining an interior and an access opening and having an outer movable door for covering the access opening, the heat shielding arrangement comprising heat shielding means being movably disposed with respect to the access opening for substantially limiting the flow of hot gas from the interior of the enclosure, said heat shielding means comprising a generally planar barrier member, and first means cooperating with said heat shielding means for defining a tortuous path from the interior of the enclosure to the outer movable door, said first means comprising deflection members disposed with respect to the access opening and about the perimeter of said generally planar barrier member.

* * * * *